Figure 1:
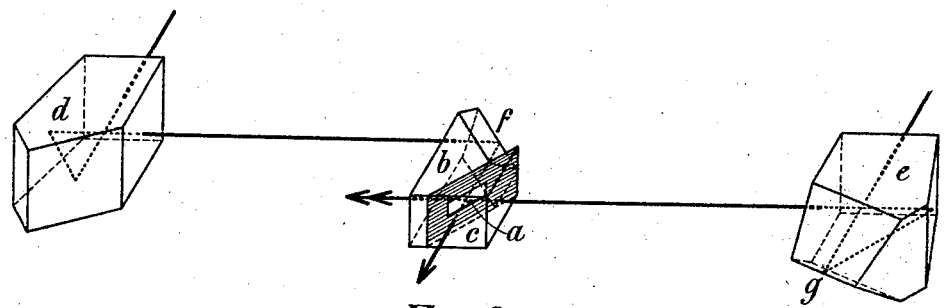

No. 830,668. PATENTED SEPT. 11, 1906.
A. KÖNIG.
COINCIDENCE TELEMETER.
APPLICATION FILED APR. 9, 1906.

UNITED STATES PATENT OFFICE.

ALBERT KÖNIG, OF JENA, GERMANY, ASSIGNOR TO THE FIRM OF CARL ZEISS, OF JENA, GERMANY.

COINCIDENCE-TELEMETER.

No. 830,668.

Specification of Letters Patent.

Patented Sept. 11, 1906.

Application filed April 9, 1906. Serial No. 310,782.

*To all whom it may concern:*

Be it known that I, ALBERT KÖNIG, doctor of philosophy, a citizen of the German Empire, residing at Carl Zeiss strasse, Jena, in the Grand Duchy of Saxe-Weimar, Germany, have invented a new and useful Coincidence-Telemeter, of which the following is a specification.

The invention consists in an improvement in coincidence-telemeters—that is, in telemeters designed for individual observation with two telescopes (but one ocular common to both) arranged on either a horizontal or vertical base-line, and with a micrometer-measuring appliance, by means of which the system of pencils of rays of one telescope is deviated in the sighting-plane so as to move one telescope image in the direction of the base-line until the points of the two telescope images in which the object-point is reproduced whose distance is to be determined lie in the same perpendicular to the base-line, the instrument ordinarily being adjusted so that the distance between both image-points in the perpendicular referred to vanishes—that is, the two image-points become coincident.

The invention particularly relates to coincidence-telemeters whose objectives have their foci lying in the same point in a cement film, which unites the two parts of a separating-prism, and to which, in the same plane, the separating-surface of this prism adjoins, whose effect already known is that the two images presented to the observer by the common ocular do not overlap, but are contiguous. With telemeters of this kind, as with coincidence-telemeters in general, the essential condition for an exact measurement is the invariability of the relative situation of both images projected by the objectives with a given position of the measuring appliance. Again, such invariability of the situation of the images rests, in general, upon the invariability of the relative position of those optical parts through which the pencils pass before the formation of the images.

The present invention consists in such formation and arrangement of this optical system which reduce the number of its individual parts, and on that account also the probability of the position of a part becoming deranged. This aim is substantially attained by arranging the entrance-surfaces of the separating-prism parallel to each other and perpendicular to the base-line. The reflecting-prisms, which were hitherto arranged between the separating-prism and the objective prism, are then dispensed with, for the system of pencils, which emerges from the objective prism or the objective in the direction of the base-line can be immediately admitted into that part of the separating-prism proper to it. The separating-prism, arranged as above, attains the simplest formation and that occupying the least space when the axis of one system of pencils is deflected but once by reflection and that of the other deflected not at all before they intersect in the cement film. The objective prisms are then, however, unequally located forward in the sighting-plane, rendering the construction of the casing difficult. From this consideration it is preferable to substitute a prism having two deflections in opposite directions for the undeflecting part of the separating-prism. The principal lengths of the axes of the two systems, each parallel to the base-line, are thus brought into alinement, and the objective prisms lie symmetrically.

In order to fully realize the advantage accruing to the invention—*i. e.*, the comparative invariability of the relative position of the images—the complex objective prism systems ordinarily employed in this kind of coincidence-telemeter should be avoided. Optical square prisms adapt themselves best as the objective prisms, and they have already been often employed in telemeters for such purposes. The general arrangement, as described, of two objective prisms and two prisms cemented together to form a separating-prism despite its great simplicity makes it by no means necessary to employ a terrestrial ocular to reërect the images projected inverted by the objectives. On the contrary, a complete image erection is also effected in the right telescope as well as the left by means of the four above-mentioned prisms if a roof or ridge shaped reflecting-surface, well known as an erecting system, be used instead of a simple reflecting-surface and for the rest care be taken that the number of simple reflecting-surfaces encountered by the effectual pencils in their passage through the instrument be an even one.

Figure 2:
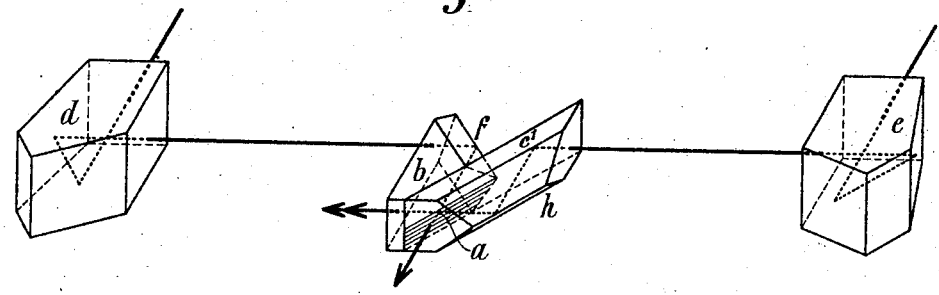
Figure 3:
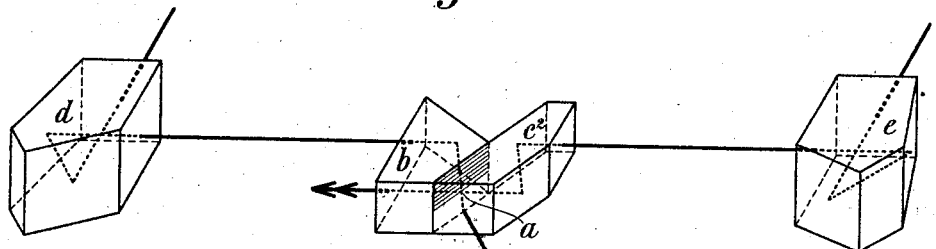
Figure 4:
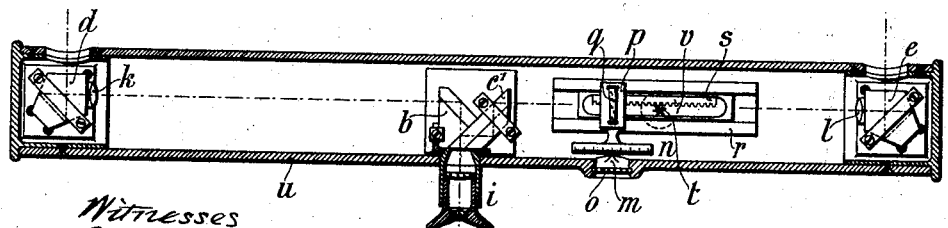

In the annexed drawings, Figure 1 is a perspective view of a scheme of four prisms, forming, according to the invention, the essential optical skeleton of the new telemeter. Fig. 2 is a similar view of a modified four-prism system. Fig. 3 is a similar view of a second modified four-prism system. Fig. 4 is a sectional plan of a telemeter with the prism system set out according to Fig. 2.

In all three examples of four-prism systems the deflecting separating-surface adjoining the cement film of the separating-prism is rendered recognizable by shading. The separating-surface lies perpendicularly to the sighting-plane, and reflection occurs on both sides, for which purpose it is silvered. It surrounds the cement film in the case of Fig. 1, and it lies below this film in Fig. 2 and above in Fig. 3. The point of intersection $a$ of the axes of the systems, in which lie the focal points of both objectives, falls in the cement film in Fig. 1 in its middle, in its boundary-line in both the other examples. The directions of the axes of both systems are continued beyond the intersecting point $a$ until at least the exit-surface of the separating-prism. Beyond the point $a$ each axis represents a compound system consisting of the direct undeflected pencils of one system and the reflected pencils of the other system. Both parts do not correspond to one another, but are complementary, giving images which are contiguous and form together the total image. In the cases of Figs. 1 and 2, where the cement film and the silvered surface lie at forty-five degrees to the base-line, the axes are directed one parallel and the other perpendicular to the base-line and emerge from perpendicular surfaces of the separating-prism without further deflection. In both these cases, therefore, can either the one or the other of the two compound systems of pencils emerging from the separating-prism be used for observation—viz., either the one emerging perpendicular to the base-line whose axis is indicated by a single arrow-head or the one emerging parallel to the base-line whose axis is denoted by a double arrow-head. Were the compound system of pencils whose axis emerges perpendicular to the base-line chosen a direct vision ocular can be used, while the compound system whose axis emerges parallel to the base-line necessitates the employment of an angled vision ocular. In the case of Fig. 3 the separating-surface has other inclination than forty-five degrees to the base-line, and while the one axis—that denoted by the double arrow-head—passes through the separating-prism parallel to the base-line and emerges undeflected from the perpendicular exit-surface, the direction of the axis denoted with a single arrow-head deviates in this instance from the perpendicular to the base-line, and this deviation becomes greater still upon emergence from the exit-surface of the separating-prism, as this surface is parallel to the base-line. In this case only the compound system denoted by a double arrow-head can conveniently be used, and that one again by means of an angled ocular.

Besides the different forms of the separating-prism, (resulting from the different inclinations of the separating-surface to the base-line,) that according to Figs. 1 and 2 on the one hand and that according to Fig. 3 on the other, there is still, mainly, a second such difference existing between the separating-prism according to Fig. 1 on the one hand and that according to Figs. 2 and 3 on the other. While in all three cases the component $b$ gives the axis of the left system the direction toward the point $a$ by a single deflection by reflection, the component $c$ in Fig. 1 conveys the axis of the right system undeflected to the point $a$, the component $c'$ in Fig. 2 and $c^2$ in Fig. 3, on the contrary, deflects the axis twice in opposite directions previously The objective prisms $d$ and $e$ are in all examples represented as Prandl's optical square prisms.

The erection of both images is only effected in the first two prism arrangements. For this purpose the ridge reflecting-surface is given in Fig. 1 to the component $b$ at $f$ and to the Prandl prism $e$ at $g$ and in Fig. 2 at $f$ and $h$. In the case of Fig. 3 the images are to be erected by a terrestrial ocular, preferably by such a one whose erecting system consists of a right-angled ridge-prism, establishing forthwith by this means the angled ocular form, which conforms to that one of the two compound systems which is parallel to the base-line and, according as above, is the most convenient to use in the arrangement of Fig. 3. If it be required to use in Figs. 1 and 2 the like compound system necessitating an angled ocular, then the angled form of the ocular is supplied by a simple reflecting-prism whose reflecting-surface supplements the simple reflecting-surfaces already in operation to make up an even number of such.

With the telemeter according to Fig. 4 an astronomical ocular is used, utilizing the compound system whose axis lies perpendicular to the base-line. The two objectives $k$ and $l$ are cemented to the Prandl prisms $d$ and $e$. The measuring appliance is operative through deflection of the right system of pencils. The indicator $m$ and the scale $n$, here half erected, are visible through the window $o$. The scale is rigidly connected with the carrier $p$ of the deflecting-prism $q$, which can be moved in a direction parallel to the axis of the system of pencils in the sliding guide $r$. The latter is connected with the rack $s$, which, together with the pinion $t$, governed from the outside of the casing $u$ by the milled head $v$, serves to give the above-mentioned movement.

What I claim as my invention, and desire to secure by Letters Patent, is—

1. Coincidence-telemeter which comprises two objectives and a separating-prism carrying a separating-surface and composed of two components cemented together, the cement film containing the focal points of both objectives in coincidence, and lying in the same plane as and adjoining to the separating-surface, the entrance-surfaces of the separating-prism being arranged parallel to one another and perpendicular to the base-line.

2. Coincidence-telemeter which comprises two objectives and a separating-prism carrying a separating-surface and composed of two components cemented together, the cement film containing the focal points of both objectives in coincidence, and lying in the same plane as and adjoining to the separating-surface, the entrance-surfaces of the separating-prism being arranged parallel to one another and perpendicular to the base-line, the said separating-prism presenting one reflecting-surface to the axis of one of the two systems of pencils before the axis passes through the cement film.

3. Coincidence-telemeter which comprises two objectives and a separating-prism carrying a separating-surface and composed of two components cemented together, the cement film containing the focal points of both objectives in coincidence, and lying in the same plane as and adjoining to the separating-surface, the entrance-surfaces of the separating-prism being arranged parallel to one another and perpendicular to the base-line, the said separating-prism presenting one reflecting-surface to the axis of one system of pencils, and two reflecting-surfaces successively to the axis of the other system of pencils, before the axes pass through the cement film.

In testimony whereof I have signed my name to this specification in the presence of two subscribing witnesses.

ALBERT KÖNIG.

Witnesses:
 PAUL KRÜGER,
 FRITZ SANDER.